United States Patent [19]

Service

[11] Patent Number: 5,057,684

[45] Date of Patent: Oct. 15, 1991

[54] UNITARY ALIGNING AND GAPPING APPARATUS FOR MODULAR OPTICAL SHAFT ENCODER

[75] Inventor: Gregg R. Service, Santa Barbara, Calif.

[73] Assignee: Robbins & Myers/Electro-Craft, a wholly owned sub. of Robbins & Myers, Inc., Eden Prairie, Minn.

[21] Appl. No.: 575,240

[22] Filed: Aug. 30, 1990

[51] Int. Cl.$^5$ .............................................. G01D 5/34
[52] U.S. Cl. ................................ 250/231.13; 250/229
[58] Field of Search ................ 250/231.13, 231.14, 250/231.16, 237 G, 239; 341/13

[56] References Cited

U.S. PATENT DOCUMENTS

| | | | |
|---|---|---|---|
| 4,184,071 | 1/1980 | Fryer et al. ................... | 250/237 G |
| 4,285,595 | 8/1981 | Fryer et al. ................... | 356/150 |
| 4,338,517 | 7/1982 | Perrine ........................ | 250/231.14 |
| 4,342,909 | 8/1982 | Accattino ..................... | 250/237 G |
| 4,475,034 | 10/1984 | Maddox et al. ............... | 250/231.16 |
| 4,794,250 | 12/1988 | Togami ........................ | 250/231.13 |

OTHER PUBLICATIONS

BEI Motion Systems Company Technical Brochure, 1989.
McCarty, Lyle H., Encoder Provides Commutation and Position Feedback Design News, 3-27-89, pp. 26-27.
Hewlett Packard Technical Brochure, Quick Assembly Optical Encoder, Jun. 1987.
Twist. Snap. Twist. Twist. An Encoder with a Difference Machine Design, Aug. 20, 1987, p. 45.

Primary Examiner—David C. Nelms
Assistant Examiner—Stephone B. Allen
Attorney, Agent, or Firm—Faegre & Benson

[57] ABSTRACT

An apparatus and method is disclosed for centering a pattern wheel of a modular optical shaft encoder and setting a predetermined gap distance between the pattern wheel and a mask and photodetector. The apparatus is built in to the encoder and facilitates aligning and gapping of the pattern wheel with respect to the mask and photodetector during installation of the encoder about a rotatable shaft. The apparatus consists of a slidable linear cam which cooperatively engages a centering collar to urge the collar against a pattern wheel, the pattern wheel is in turn urged into a predetermined position. The collar is retractable from contact with the pattern wheel after the pattern wheel is mounted in position on the rotatable shaft to allow rotation of the wheel and the shaft.

12 Claims, 5 Drawing Sheets

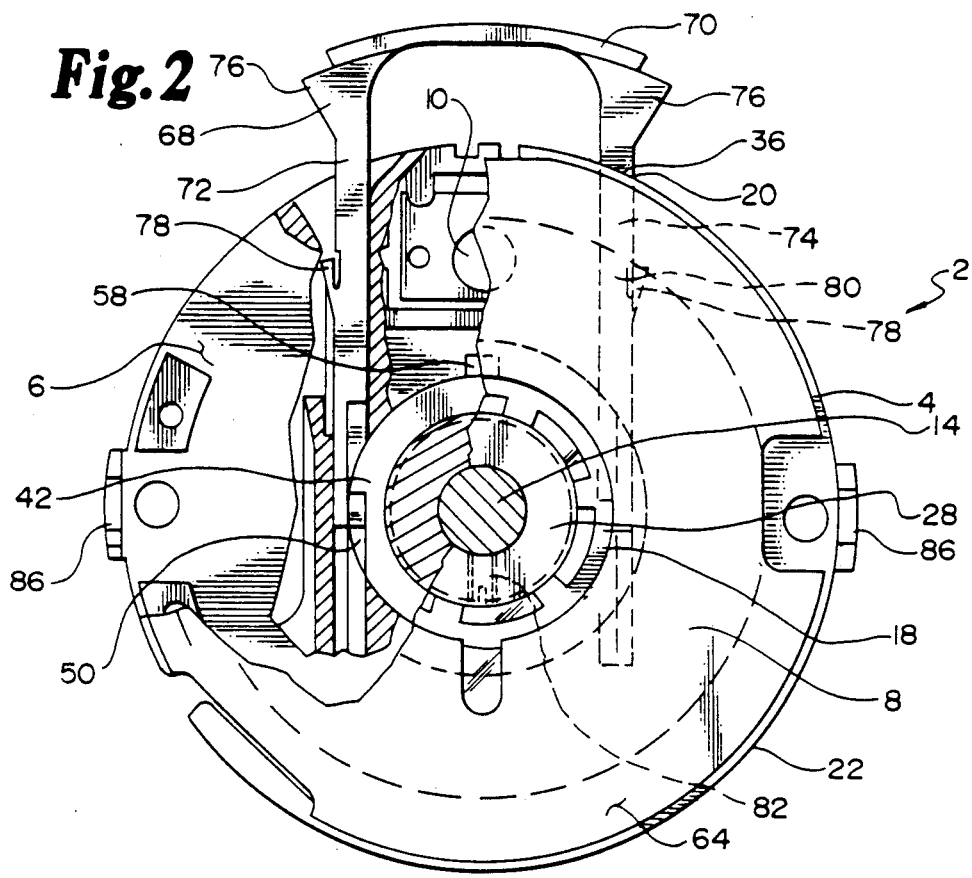
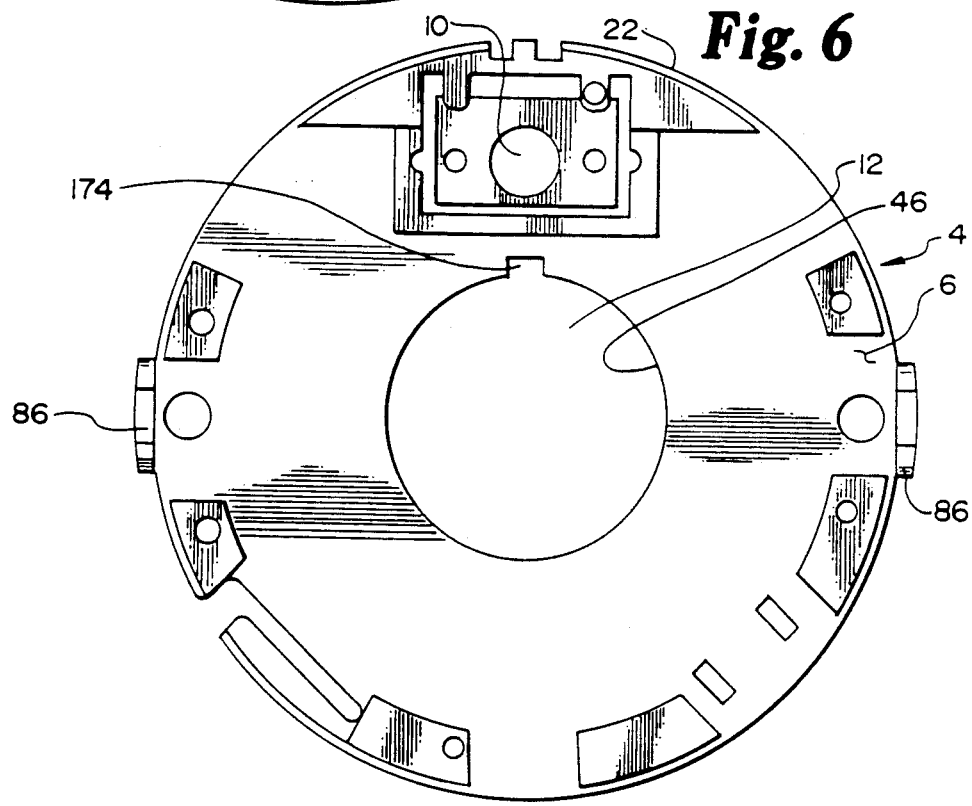

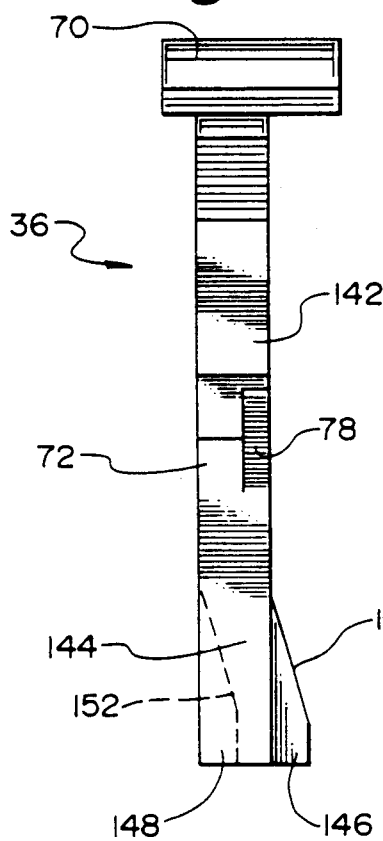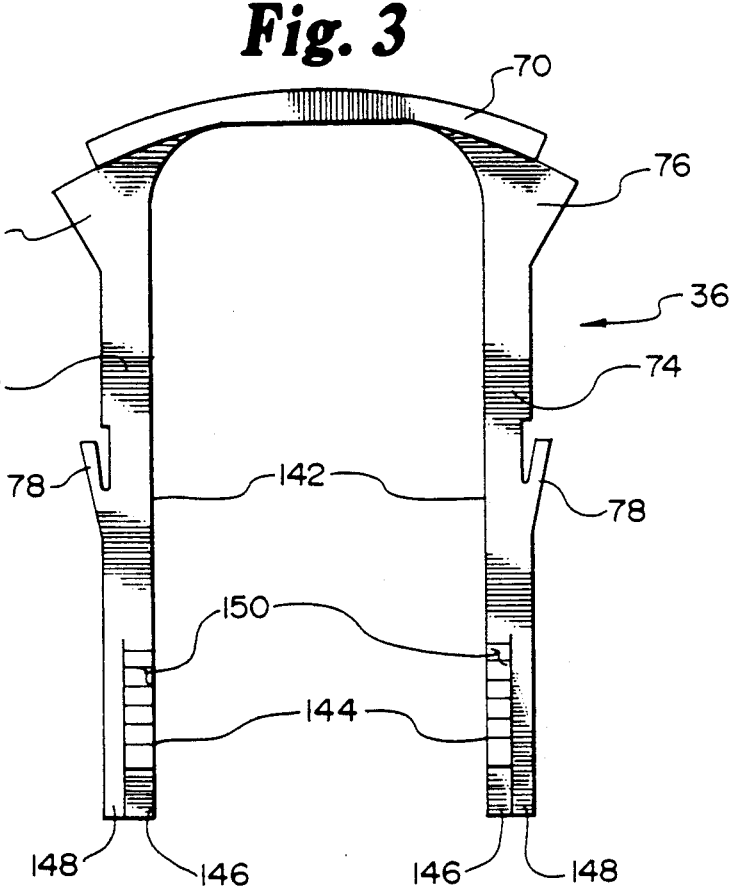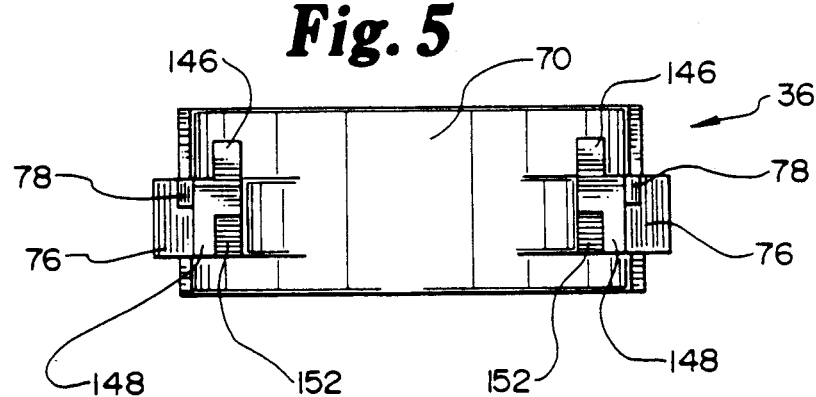

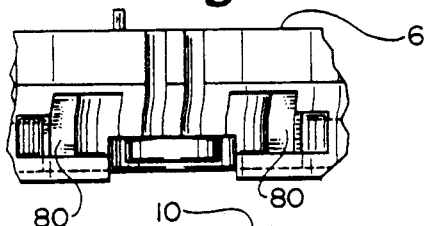
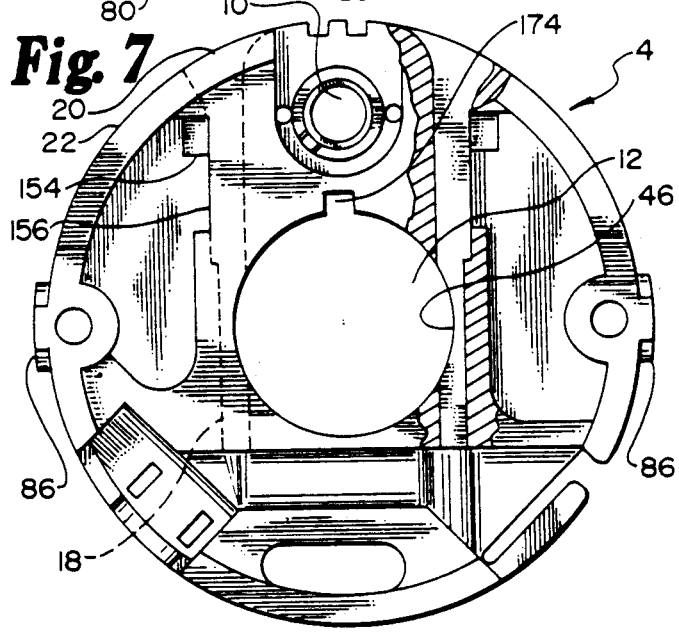
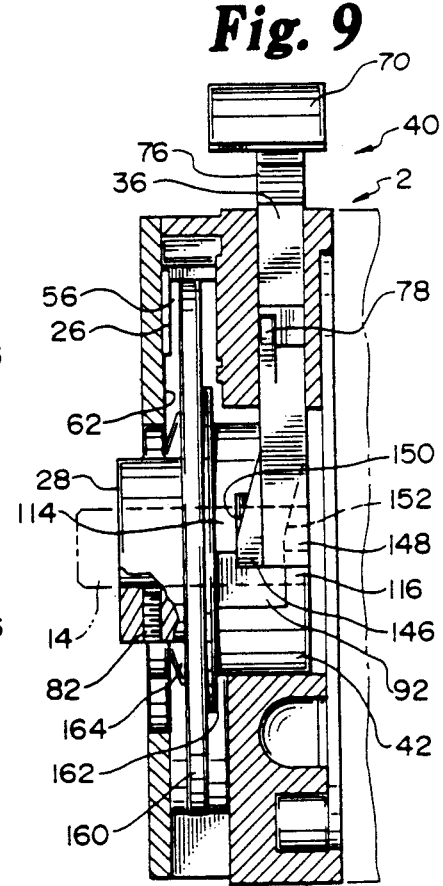
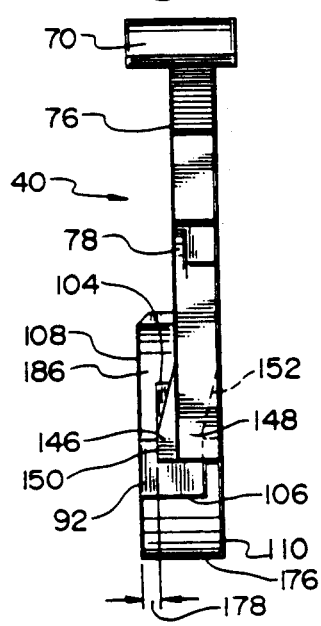
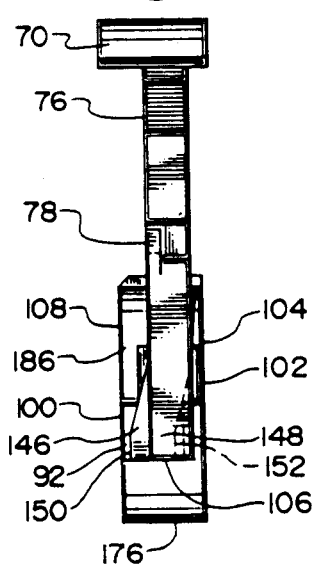
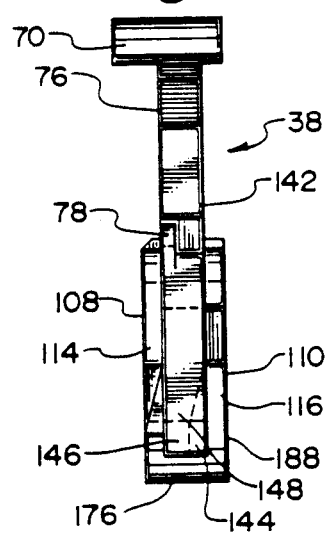

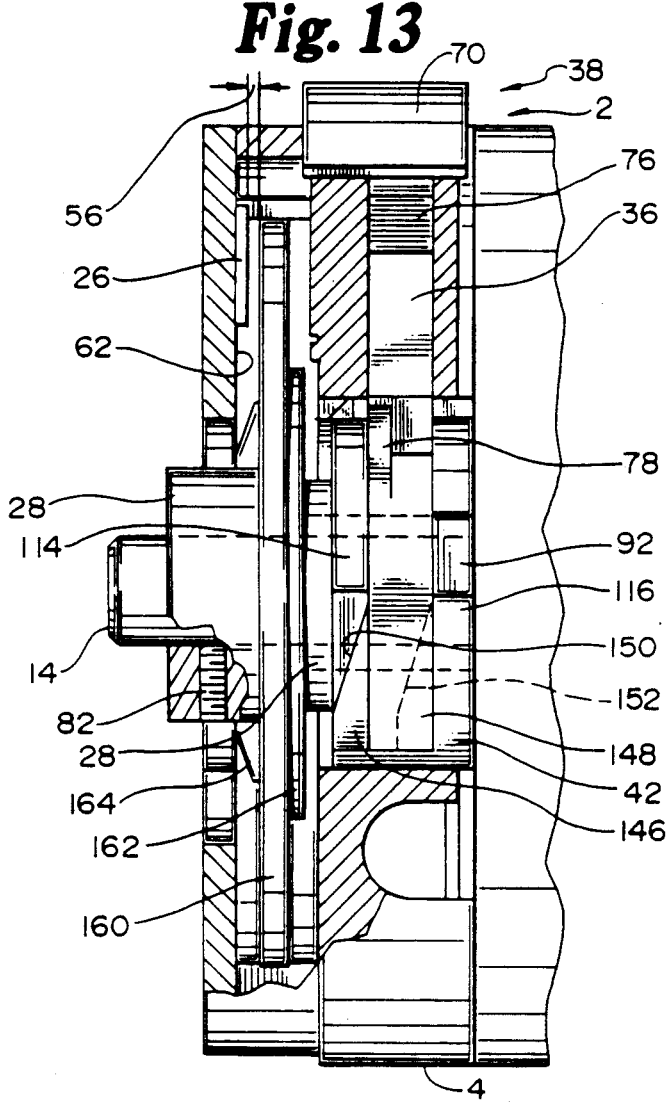
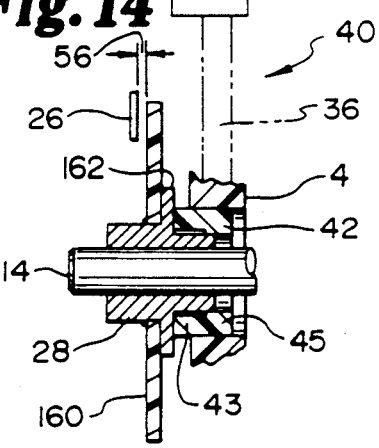
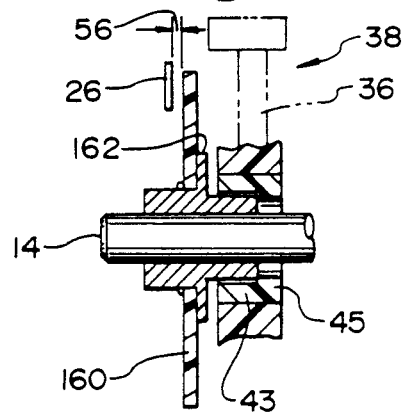
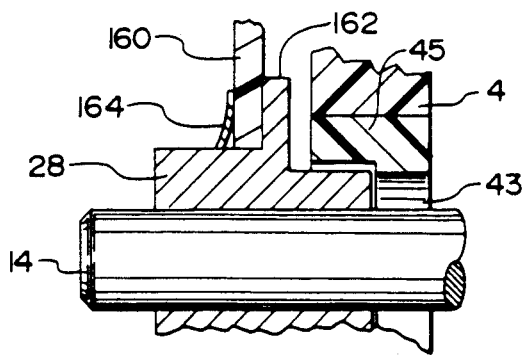
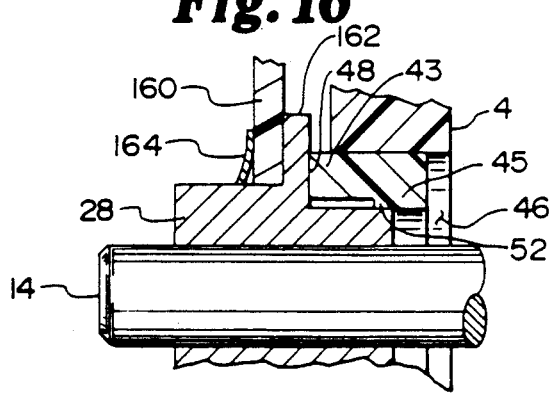

UNITARY ALIGNING AND GAPPING APPARATUS FOR MODULAR OPTICAL SHAFT ENCODER

BACKGROUND OF THE INVENTION

The present invention relates to a novel method and apparatus for installing a modular optical shaft encoder. More particularly, the invention provides means for easy centering and gapping of a pattern wheel with respect to a mask and a photodetector in the modular shaft encoder during installation.

Shaft encoders are devices which detect and convert various aspects of the rotation of a rotatable shaft into electronic signals. For example, the encoder could measure the speed of a rotating shaft, or keep track of the number of times that the shaft has rotated.

Two common types of shaft encoders are the self contained encoder and modular encoder. The self contained encoder includes its own shaft upon which the rotatable pattern wheel is mounted. This shaft is coupled to the working shaft. By contrast, the modular encoder's rotatable pattern wheel is mounted directly on the working shaft.

Optical shaft encoders use a photodetector stationary with respect to the shaft and the wheel to detect rotation of the shaft. The photodetector is positioned on an underside of a printed circuit board across a pattern wheel from a light source. Phototransistors are preferred but photodiodes or photovoltaic cells could also be used. Light emitting diodes, LEDs, producing infrared light primarily in the 880 nanometer wavelength are preferred but other LED's or incandescent light sources could be used. The pattern wheel has a transparent disk with an opaque pattern which alternately blocks and transmits the light from the light source to the photodetector as the wheel rotates with the shaft. The mask is positioned between the pattern wheel and the photodetector. It has a pattern which is complimentary to a pattern on the pattern wheel such that the light from the light source is alternately blocked and transmitted as the pattern wheel rotates. Light pulses thereby generated are converted into electronic signals by the photodetector which receives the pulses. The electronic signals contain information about the rotation of the pattern wheel, and hence, the shaft.

The advantages of the modular encoder over the self contained encoders are that the modular encoder is less costly, has fewer working parts and has less rotational mass than the self contained encoder. A lower rotational mass reduces dynamic influence and improves encoder accuracy.

Disadvantages of the modular encoders of the prior art are that they require skill, time and special equipment, such as oscilloscopes and gapping paper, to assemble and precision install. The present invention obviates the need for skill or special tools, and substantially reduces the time required to install a modular optical shaft encoder.

SUMMARY OF THE INVENTION

The present invention comprises an integral device for both gapping a pattern wheel and aligning the mask and photodetector of the encoder with respect to the pattern wheel in a modular optical shaft encoder. The device consists of a linear cam operatively engaged with a centering collar. The centering collar can have any external shape which would be axially slidable within the encoder body opening. A ring shape is preferred. A center bore of the collar can be any shape which would uniquely align the pattern wheel with respect to the a mask and a photodetector. A circular bore is preferred. Both the cam and the centering collar are seated within the body of the modular encoder.

The cam preferably is formed of two parallel prongs connected at one end by a bridge piece. The prongs extend from the bridge piece into an opening in the encoder body. This opening has the centering collar nested within it. A hub of the pattern wheel rests within the centering collar and the shaft is inserted through a central shaft hole in the hub. The centering collar is preferably placed concentrically with the encoder body opening. The outer circumference of the collar slidably engages both ends of the prongs of the cam such that sliding the cam radially outward urges the collar toward a hub of a pattern wheel. The centering collar engages the pattern wheel with both an interference fit and a light press fit contact which position the wheel a predetermined gap distance from the photodetector and also aligns an opaque pattern on the pattern wheel aligned with the photodetector, mask and light source.

In this configuration, the pattern wheel is easily mounted to the shaft, and the encoder body is easily mounted to a motor housing or some other element stationary with respect to the shaft. Sliding the cam radially toward the shaft withdraws the centering collar from contact with the pattern wheel such that the pattern wheel is rotatable without friction being applied to it by the collar. The cam is preferably locked in the radially inward position during operation of the encoder through engagement of a set of flanges on the cam by a cover which fits over the encoder body.

The encoder body, centering collar, cover and cam are preferably molded of glass filled polycarbonate. The pattern wheel is comprised of the hub and a pattern disk. The pattern disk is preferably formed of glass, with the pattern made of sputter deposited chrome that is photo-chemically etched. The pattern disk can also be a plastic, such as Estar® high resolution photo emulsion film obtainable from Kodak, photo-chemically etched stainless steel or chrome, or chrome or other metal that is vapor deposited to form the pattern. The hub is preferably made of aluminum or stainless steel but could also be plastic.

The centering collar preferably has an alignment pin which slides into an axial channel inscribed on the inner circumference of the encoder body opening parallel with the axis of the shaft the encoder body for the purpose of aligning the centering collar with the rest of the encoder for easy installation of the linear cam.

Pattern wheels installed using the preferred embodiment are gapped within the optimal range of 10 to 20 thousandths of an inch from the mask. Typically, there is a plus or minus 2 to 3 thousandth of an inch variation in gap distance. There is typically a plus or minus 0.2 thousandths of an inch variation in centering the pattern wheel. The aligning of the encoder body mask assembly about the pattern wheel is typically within plus or minus 2 thousandths of an inch.

BRIEF DESCRIPTION OF THE DRAWINGS

FIG. 2 is a front elevational view thereof with parts cut away showing movable immobilized pattern wheel, cam and centering collar.

FIG. 3 is a front elevational view showing the linear cam.

FIG. 4 is a right side elevational view of the linear cam showing the detail of FIG. 3.

FIG. 5 is a bottom plan view of the cam showing the detail of FIG. 3.

FIG. 6 is a front elevational view of the encoder body.

FIG. 7 is a rear elevational view of the encoder body with partial section showing one passage interior and showing the other passage in phantom.

FIG. 8 is a fragmentary top plan view of the encoder body showing the detail of FIG. 6.

FIG. 9 is a left side elevational view thereof with parts cut away and showing the immobilized pattern wheel, cam and centering collar relative to the rest of the encoder.

FIG. 10 is a left side elevational assembly view showing the cam and the centering collar in position to immobilize the pattern wheel.

FIG. 11 is a left side elevational assembly view thereof showing the cam in partial travel position.

FIG. 12 is a left side elevational assembly view thereof showing the cam inwardly positioned and the centering collar retracted to allow rotation of the pattern wheel.

FIG. 13 is a view similar to that of FIG. 10 showing the cam inwardly positioned and centering collar retracted to allow rotation of the pattern wheel.

FIG. 14 is a simplified sectional left side elevational diagram of FIG. 13 illustrating the mechanical function of the cam and the centering collar immobilizing the pattern wheel in position to be mounted on the shaft.

FIG. 15 is a simplified sectional left side elevational diagram showing the cam inwardly positioned and the centering collar retracted to allow rotation of the pattern wheel.

FIG. 16 is a fragmentary sectional detail of the shaft, the pattern wheel and the centering collar showing an enlarged portion of FIG. 14; and FIG. 17 is a fragmentary sectional detail of the shaft, the pattern wheel and the centering collar showing an enlarged portion of FIG. 15.

DETAILED DESCRIPTION OF THE INVENTION

Figure 1:
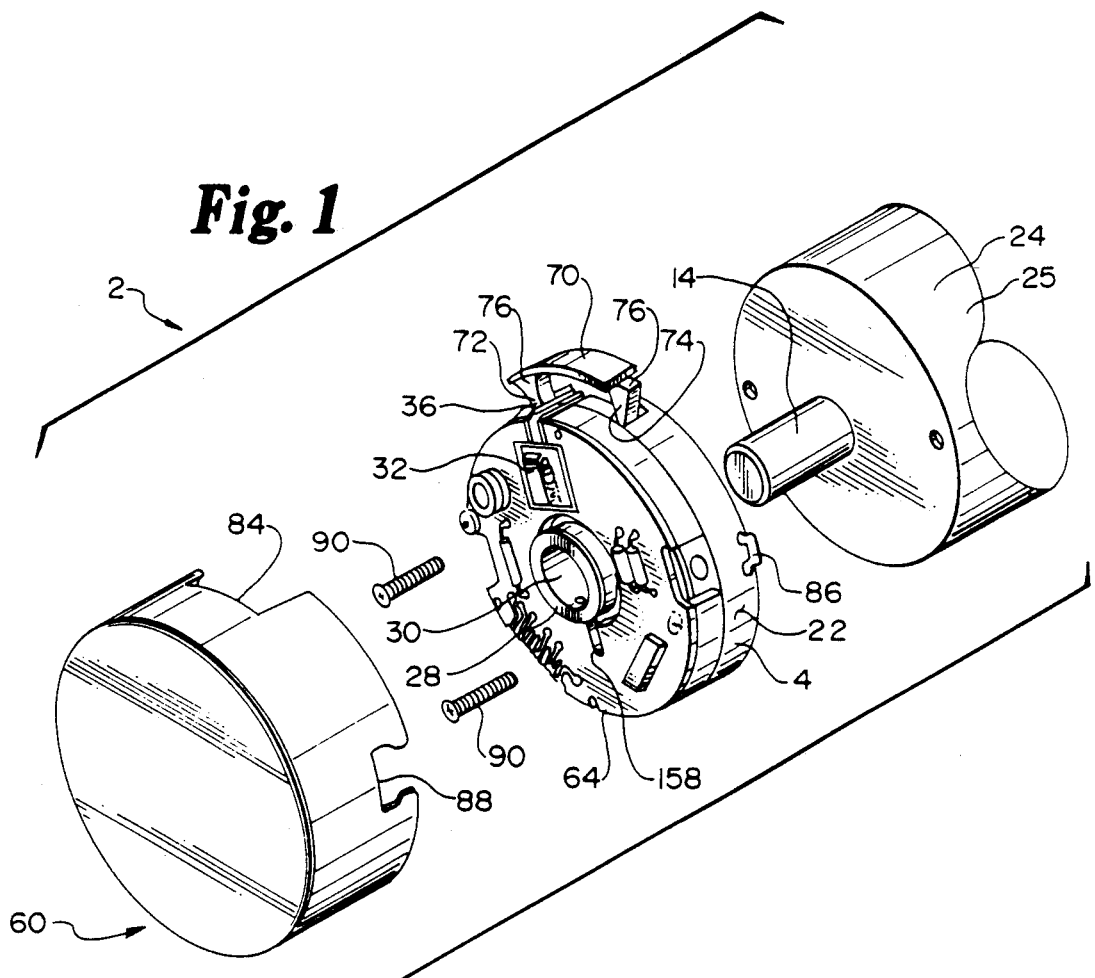
FIG. 1 is an exploded perspective of the modular optical shaft encoder showing placement of the encoder on a motor shaft.

The invention comprises a method and apparatus for simultaneously gapping and aligning a pattern wheel 8 of a modular optical shaft encoder 2 with a mask 26 and photodetector 32. The encoder 2 fits over a rotatable shaft 14, the shaft inserted through a central shaft hole 30 of a hub 28 of the pattern wheel, the hub nested within the center bore 112 of a centering collar 42, as shown in FIGS. 1, 2, 9, and 13. The collar 42 is, in turn, nested within an encoder body 4 having an opening 12 with a circumference 46. The pattern wheel 8 is mounted on the shaft 14 and rotates with it. The encoder body 4 is affixed to an external element 24 which is Preferably a motor housing 25, as shown in FIGS. 1, 9, and 13.

Figure 1A:
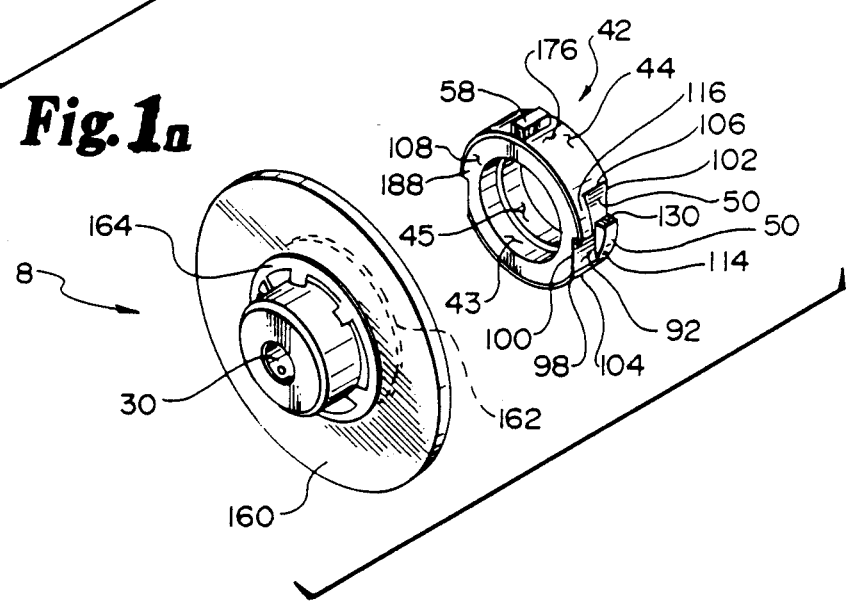
FIG. 1a is an exploded detail perspective view of a pattern wheel and a centering collar as they would be oriented in the encoder.

The pattern wheel 8 is an assembly comprising a transparent disk 160 having an opaque pattern (not shown), a hub 28 with an integral backing flange 162 and a central shaft hole 30, and a preferably metallic retaining ring 164, as shown in FIGS. 1a, 9, 13, 14, 15, 16, and 17. The transparent disk 160 has a central hole and is preferably made of glass. The opaque pattern (not shown) alternately blocks and transmits light from the light source 10 to the mask 26 and thence to the photodetector 32 as the wheel 8 rotates with the shaft 14 (alignment shown in FIGS. 9, 13-15.) The central hole of the transparent disk 160 fits around the hub 28 and is bonded with adhesive (not shown) against the integral backing flange 162 having a diameter greater than the central hole of the disk 160, as shown by FIGS. 1a and 14-17. The flange 162 is disposed about halfway along a length of the hub 28, as shown by FIGS. 14-17. The metallic retaining ring 164 fits over the hub 28 for retaining the transparent disk 166 on the hub 28 and against the backing flange 162, as shown by FIG. 1a.

The encoder body 4 preferably has a pair of mirror image passages 80 parallel with each other and also generally parallel with the upper surface 6 of the encoder body 4. The passages communicate between an exterior 22 of the encoder body 4 and a generally central opening 12 in the encoder body 4, as shown in FIGS. 2, 7, and 8. The passages 80 have proximal ends 18 which communicate with the central opening 12 and distal ends 20 which communicate with the exterior 22 of the encoder body 4. Both passages 80 preferably communicate generally tangentially with the opening 12 of the encoder body 4, with the proximal ends 18 separated from each other by the opening 12. A centering collar 42 is disposed within the opening 12, the outside circumference 44 of the collar 42 nested within the inner circumference 46 of the opening 12, as shown in FIGS. 2, 16 and 17.

The centering collar 42 is axially slidable within the opening 12 in response to the urging of a linear cam 36 preferably comprising two parallel prongs 72, 74 disposed along passages 80. The prongs are connected at the exterior 22 of the encoder body 4 by a bridge piece 70 as shown in FIGS. 3, 4, 5, 13, and 14. The linear cam 36 is slidable along the passages from a first position 38 to a second position 40.

The centering collar 42 preferably has an alignment pin 58 extending from the outside circumference 44 of the centering collar 42, shown in FIG. 1a. The pin 58 is received by an axial channel 174 inscribed on the inner circumference 46 of the encoder body opening 12, as shown in FIG. 2. Of course, the positions of pin 58 and the channel 174 may be reversed such that the channel 174 is inscribed on the outside circumference 44 of the centering collar 42 and the alignment pin 58 is present on the inner circumference 46 of the encoder body opening 12. The pin 58 prevents insertion of the collar 42 into the inner circumference 46 of the encoder body opening 12 without also inserting the pin 58 into the channel 174. When the pin 58 is inserted into the channel 174 with the smaller diameter section 45 of the centering collar 42 disposed away from the indented upper surface 6 of the encoder body 4, the centering collar 42 is properly aligned for the plurality of indentations and projections 50 on the outside circumference 44 of the collar 42 to engage the linear cam 36 as shown in FIGS. 2, 9, and 13.

The prongs 72, 74 cooperate with a plurality of projections and indentations 50 on the outside circumference 44 of the centering collar 42 such that placing the cam 36 in the second position 40 with the bridge piece 70 radially away from the encoder body 4 urges a first face 108 of the centering collar 42 into a light press fit contact 48 with the backing flange 140 integral with the hub 28, as shown in FIG. 9. The hub 28 inserts through a larger inside diameter section 43 of the centering collar 42 and fits with an interference fit 52 into a smaller inside diameter section 45 of the centering collar 42, as shown in FIGS. 14–17. Together, the light press fit contact 48 between the centering collar 42 and the backing flange 162 and the interference fit 52 between the inside diameter 43 and the hub 28 center the encoder body 4 with respect to the pattern wheel 8 during mounting of the encoder body 4 on the external element 24, and position the wheel 8 the predetermined gap distance 56 from the mask 26, shown in FIGS. 9, 13, 14, and 15.

The mask 26 is disposed on an underside 62 of a printed circuit board 64 affixed over an upper body surface 6 of the encoder body 4. The pattern wheel 8 is positioned between the upper surface 6 of the encoder body and the underside 62 of the circuit board 64 as shown in FIGS. 9 and 13. A photodetector 32 affixed to the circuit board 64 behind the mask 26 from the pattern wheel 8 (as shown in FIG. 1) detects a beam of light (not shown) produced by a light source 10 mounted on the encoder body 4 across from the photodetector 32. Some of the light penetrates both the pattern wheel 8 and the mask 26 as the pattern wheel 8 rotates, the nature of the light reaching the photodetector 32 corresponding to the nature of the shaft rotation.

The pattern wheel 8 is mounted on the shaft 14 preferably by a set screw 82 threaded radially through the hub, as shown in FIGS. 1, 9 and 13. The encoder body 4 is mounted on the external element 24 while the cam 36 is in the second position 40 as shown in FIG. 9 and 10. Once the pattern wheel 8 and the encoder body 4 have been mounted, the cam 36 can be slid to the first position 38 such that the bridge piece 70 is positioned against the exterior 22 of the encoder body 4, as shown in FIGS. 12 and 13. FIG. 11 shows the cam 36 intermediate between the first position 38 and second position 40. Sliding the cam 8 to the first position 38 displaces the centering collar 42 from contact with the hub 28 of the pattern wheel 8 which allows the pattern wheel 8 to rotate freely with the shaft 14 while the alignment of the pattern wheel 8 and the predetermined gap distance 56 are preserved, as shown in FIGS. 15 and 17.

In the preferred embodiment, a pair of mounting grooves 88 defined by encoder body cover 60 are snap fit over cover mounting flanges 86 on the mounted encoder 2 as shown in FIG. 1. The preferred cover 60 has a cut out 84 wide enough to fit around the bridge piece 70 but not wide enough to admit a pair of outwardly extending flanges 76 on the cam 36. The cover 60 fits over the encoder body 4 and the flanges 76 to retain the cam 36 in the first position 38 also shown in FIG. 1.

The encoder body 4 is preferably screw mounted on the stationary external element 24, which is preferably the motor housing 25, as shown in FIGS. 1, 9, and 13.

The centering collar, though preferably annular, may have any shape which permits axial translation within the opening 12 of the encoder body 4 without allowing radial movement.

The plurality of indentations and projections 50 preferably comprises a pair of planar cuts 92 in the outside circumference of the collar 44, both cuts 92 parallel to an axis of the collar 42 and perpendicular to a diameter of the collar 42. Each cut 92 is disposed in mirror image fashion across the collar 42, each near an end of the collar diameter, as shown in FIGS. 1a, 2, and 13. A perimeter 98 of each cut 92 is preferably rectangular with each cut 92 preferably having a first side 100 and second side 102 and a first end 104 and a second end 106, as shown in FIG. 1a. Each cut 92 is bounded on both sides 100, 102 by a first face 108 and a second face 110 of the collar 42 and on both ends 104, 106 by an uncut portion 176 of the outside circumference 44 of the collar 42, as shown in FIG. 1a.

Each cut 92 preferably has a first 114 and a second 116 projection extending from the cut 92. As shown in FIG. 1a. Each of the two projections 114, 116 on each cut 92 is symmetrical with the other projection about a midpoint 130 of the cut 92 halfway between ends 104, 106 and sides 100, 102. Each projection 114, 116 has a width 178 less than one half a parallel distance between sides 100 and 102 of the cut 92. Each projection 114, 116 has a length equal to approximately half a distance between the ends 104 and 106 of the cut 92 perpendicular to the ends 104 and 106, as shown in FIGS. 1a and 10. Each projection 114, 116 has a part 186 contiguous with the outside circumference 44 of the centering collar 42, as shown in FIGS. 1a, 10 and 11. Each projection 114, 116 also has a side 188 contiguous with one of the faces 108, 110 of the centering collar 42, as shown in FIGS. 1a and 12. Each projection 114, 116 has a height formed by a continuation of the uncut portion 176 of the outside circumference 44 of the collar 42, as shown in FIG. 1a.

Each prong 72, 74 of the cam 36 has a middle segment 142 and an end segment 144. The middle segment 142 is cross sectionally rectangular. The end segment 144 has an inner layer 146 and an outer layer 148. The inner layer 146 is displaced toward the upper body surface 6 of the encoder body 4 from the outer layer 148 when the cam 36 is inserted into the encoder body 4, as shown in FIGS. 3, 4, 5, and 9–13. The inner layer 146 has an upper layer surface 150 and a lower layer surface 152 each of which slope into coplanarity with a corresponding surface of the middle segment 142 where the end segment 144 of the prong 72, 74 merges with the middle segment 142. The inner layer 146 of each prong 72, 74 slidably engages one of the planar cuts 92 of the centering collar 42, as shown in FIGS. 10–12. The sloping upper 150 and lower 152 surfaces of the inner layer 146 of each prong 72, 74 contact the projections 114, 116 on the cut 92 such that the sloping upper layer surface 150 and sloping lower layer surface 152 function as ramps for the projections 114, 116 on the cut 92. As the cam 36 is slid from the second position 40 to the first position 38 within passages 80 in the encoder body 4, the upper 150 and lower 152 surfaces of the inner layer 146 of each prong 72, 74 engage the first 114 and second 116 projections on the centering collar 42 and displace the collar 42 axially away from the hub 28 of the pattern wheel -8 such that the small diameter section 45 of the centering collar 42 is disengaged from the interference fit 52 with the hub 28, as shown in FIGS. 9–16.

As the cam 36 is slid from the first 38 to the second 40 position, the pattern wheel hub 28 is urged back into the interference fit with the smaller inside diameter section 45 of the centering collar 42 by the sloped upper layer surface 150 and lower layer surface 152 of the end segment 144 of the prongs 72, 74 acting on the first 114 and second 116 projections on the centering collar 42, as shown in FIGS. 9–16.

The passages 80 in the encoder body 4 are preferably shaped to prohibit insertion of the cam 36 into the passages 80 with the inner layer 146 of the cam 36 displaced away from the pattern wheel 8. A preferred cross sectional passage 80 shape is shown in FIG. 8.

Each prong 72, 74 of the cam 36 preferably has a barb 78 which is compressed toward the prong 72, 74 as it slides past a rim 154 of a window 156 communicating with the passage 80 in which the prong 72, 74 is positioned. The barb 78 springs away from the prong 72, 74 upon sliding past the rim 154 such that the barb 78 engages the window rim 154 if the cam is slid radially outwardly from the encoder body 4 to where the prong 72, 74 engages the rim 154 of the window 156, as shown in FIGS. 2 and 7. The barb 78 prevents disengagement of the cam 36 from the encoder body 4.

The printed circuit board 64 preferably defines an access slot 158 for allowing a tool (not shown) such as an allen wrench to access the set screw 82 in the pattern wheel hub 28 to tighten the set screw 82 and mount the pattern wheel 8 on the shaft 14, as shown in FIG. 1.

Although the present invention has been described with reference to preferred embodiments, workers skilled in the art will recognize that changes may be made in form and detail without departing from the spirit and scope of the invention.

What is claimed is:

1. An improved modular optical shaft encoder having an encoder body with an upper body surface constructed and arranged for receiving a pattern wheel generally radially parallel to the upper surface, the encoder body also having a light source affixed to the upper surface and an opening constructed and arranged for receiving a rotatable shaft, the encoder body being constructed and arranged for mounting on an external element stationary with respect to the rotatable shaft, the encoder also having a mask mounted above the encoder body upper surface aligned opposite the light source, the pattern wheel positioned between the upper body surface of the encoder body and the mask, the hub coaxially aligned with the opening of the encoder body, the hub having a central shaft hole for receiving the shaft inserted through the opening in the encoder body, the hub of the pattern wheel being constructed and arranged for axial positioning and mounting on the shaft, the encoder also having a photodetector positioned behind the mask from the wheel on the upper surface of the encoder body, the photodetector aligned with the light source and facing the upper body surface through the mask such that light from the light source is detectable by the photodetector through the pattern wheel and through the mask, wherein the improvement comprises:

the encoder body defining a radial enclosed passage parallel to the upper surface, the proximal end of the passage communicating with the opening and the distal end communicating with an exterior of the encoder body;

a linear cam mounted for slidable movement from a first to a second position along the passage within the encoder body for extension through the proximal and distal ends of the passage;

a centering collar having a central collar bore, the collar coaxially positioned for axial translation within the opening, an outside circumference of the collar constructed and arranged for nesting within a circumference of the opening, the collar also having a plurality of circumferential indentations and projections constructed and arranged for operative engagement with the linear cam extending through the proximal end of the passage;

such that movement of the cam to the first position displaces the collar from contact with the hub and movement of the cam to the second position urges translation of the collar into a light press fit contact with the wheel and establishes an interference fit between the hub and an inside circumference of the collar bore, with the light press fit contact and interference fit together causing alignment of the pattern wheel with the mask and the light source and positioning of the wheel a predetermined gap distance from the mask, the alignment and the gap distance being maintained during mounting of the pattern wheel on the shaft and mounting of the encoder body on the external element.

2. The apparatus according to claim 1 wherein the external element comprises a motor housing.

3. The apparatus according to claim 1 wherein the centering collar is annular in shape.

4. The apparatus according to claim 2 wherein the inside circumference of the collar bore has a larger inside diameter section positioned toward the pattern wheel and a smaller inside diameter section positioned away from the pattern wheel, such that only the smaller inside diameter section may form the interference fit with the pattern wheel hub.

5. The apparatus according to claim 4 wherein the encoder body defines two mirror image parallel passages each having a proximal end communicating tangentially with the encoder body opening and a distal end communicating with the exterior of the encoder body and wherein the cam comprises a first prong and a second prong which mirrors the first prong, each prong slidably mounted within one of the passages, the prongs connected to each other by a bridge piece where the prongs extend to the exterior of the encoder body through the distal ends of the passages when the cam is placed in the second position, such that the centering collar is nested between the mirror image prongs within the opening and the plurality of indentations and projections on the outside circumference of the centering collar comprise a first set and a mirror image second set, each set operatively engaged by a prong.

6. The apparatus according to claim 5, wherein each prong has an outwardly extending barb which is compressed toward the prong as the prong is first inserted into the passageway until the barb passes a rim of a window in the passageway, at which point the barb springs away from the prong to prevent retraction of the prong out of the encoder body through engagement of the barb with the rim of the window when the prong is moved radially outwardly from the encoder a sufficient distance to bring the barb in contact with the rim.

7. The apparatus according to claim 5 wherein the pattern wheel comprises:

a pattern disk having a central hole;

the hub having a generally cylindrical shape with a diameter equal to or less than that of the central hole of the pattern disk, the hub also having an integral backing flange, the flange having a diameter greater than the central hole of the pattern disk and the flange being disposed at approximately half the length of the hub; and a retaining ring which fits tightly over the hub after the hub has been inserted into the central hole of the disk to retain the disk on the hub against the backing flange.

8. The apparatus according to claim 7 wherein each of the parallel prongs of the linear cam comprise:
a middle segment having a generally rectangular cross section;
an end segment having an inner layer and an outer layer, with the inner layer displaced toward the upper body surface of the encoder body from the outer layer when the prong is inserted into the encoder body, the inner layer having an upper layer surface and a lower layer surface each of which slope into coplanarity with a corresponding surface of the middle segment where the end segment merges with the middle segment, such that the inner and outer layers of the end segment operatively engage the plurality of circumferential indentations and projections on the outside circumference of the centering collar.

9. The apparatus according to claim 8 wherein the plurality of projections and indentations comprise:
a pair of planar parallel mirror image cuts taken out of the circumference of the centering collar disposed radially outwardly from the inside circumference of the centering collar each cut having a midpoint at the intersection of the planar cut and a diameter of the centering collar, each cut disposed perpendicularly to the diameter of the collar, and each cut having a generally rectangular perimeter having a pair of ends and a pair of sides, the ends bordered by the uncut circumference of the collar and the sides bordered by a first and a second face of the collar;
each cut having a pair of projections extending from the cut symmetric about the midpoint of the cut, each projection having a surface height formed by a continuation of the uncut circumference of the collar over the cut surface, each projection having two parallel planar sides perpendicular to the cut, one side contiguous with one of a pair of faces of the collar, each projection extending from the side contiguous with the face of the collar to a width less than ½ a distance to the opposite face of the collar and each projection having a first projection end which is contiguous with the outside circumference of the collar where the outside circumference meet one of the cut ends and each projection having a length which is approximately ½ a distance from the end of the projection contiguous with the outside circumference to the opposite cut end;
such that the inner layer of each prong engages one of the cuts of the collar, with the upper and lower surfaces of the inner layer of each prong engaging the projection sides which are not contiguous with the collar faces, and
such that radial movement of the cam toward the centering collar causes the sloping inner layers of the ends of the prongs to urge the centering collar away from the pattern wheel hub, and radial movement of the cam radially away from the centering collar causes the sloping inner layers of the ends of the prongs to urge the centering collar toward the pattern wheel and into the interference fit with the hub of the pattern wheel and also urges one of the faces of the collar into the light press fit contact with the pattern wheel backing flange, the fit and the contact together aligning and gapping the pattern wheel with respect to the mask.

10. The apparatus according to claim 5 wherein the linear cam has a pair of outwardly extending flanges where the bridge piece connects the two prongs of the cam, the apparatus also having a cover having a groove which axially receives the bridge piece when the cam is placed in the second position, but which does not admit the flanges, such that when the cover is mounted on the encoder body, the linear cam is held in the second position.

11. In a method of mounting and aligning a modular optical shaft encoder of the type wherein a rotatable shaft is inserted through an opening in an encoder body and through a hub of a rotatable pattern wheel, the hub having a central shaft hole to receive the shaft, the encoder body having an upper body surface to receive the pattern wheel, the encoder having a photodetector mounted above a mask, the photodetector facing a light source through the mask and the pattern wheel, the light source being mounted on upper body surface of the encoder body, the improvement comprising:
immobilizing the pattern wheel, aligning the pattern wheel with respect to the mask and the photodetector and positioning the pattern wheel a predetermined gap distance from the mask and the photodetector through an interference fit between an inside circumference of a center bore of a centering collar and the pattern wheel hub, and a light press fit contact between the collar and the wheel, the centering collar positioned for axial translation within the body opening, the encoder body also having a radial enclosed passage generally parallel to the upper surface of the encoder body, a proximal end of the passage communicating with the opening and a distal end of the passage communicating with an exterior of the encoder body, the encoder body also having a linear cam mounted for slidable movement from a first to a second position along the radial passage, the cam operatively engaging a plurality of indentations and projections on the outer circumference of the centering collar such that the immobilizing, aligning and positioning of the pattern wheel is effected by moving the cam to the second position which urges the collar toward the pattern wheel and into the light press fit contact with the wheel and interference fit with the hub;
inserting a rotatable shaft through the opening in the encoder body, through the centering collar, center bore and through the central shaft hole in the pattern wheel hub;
mounting the pattern wheel hub on the shaft;
mounting the encoder body to an element fixed with respect to the rotatable shaft; an
moving the linear cam to the first position radially inward toward the opening from the second position such that the centering collar is displaced from the light press fit contact with the wheel and interference fit with the pattern wheel hub.

12. The method according to claim 8 comprising the additional step of:
placing a cover over the encoder, the cover and cam having means for maintaining the cam in the second position while the cover remains on the encoder.

* * * * *